United States Patent
Hayman et al.

(10) Patent No.: US 9,435,298 B2
(45) Date of Patent: Sep. 6, 2016

(54) DEDICATED EGR ENGINE WITH DYNAMIC LOAD CONTROL

(71) Applicant: GM GLOBAL TECHNOLOGY OPERATIONS LLC, Detroit, MI (US)

(72) Inventors: Alan W. Hayman, Romeo, MI (US); Robert S. McAlpine, Lake Orion, MI (US); Edward J. Keating, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 261 days.

(21) Appl. No.: 13/937,280

(22) Filed: Jul. 9, 2013

(65) Prior Publication Data

US 2015/0013651 A1  Jan. 15, 2015

(51) Int. Cl.
*F02M 25/07* (2006.01)
*F02M 35/10* (2006.01)
(Continued)

(52) U.S. Cl.
CPC .......... *F02M 26/43* (2016.02); *F02B 27/0268* (2013.01); *F02M 26/09* (2016.02); *F02M 26/21* (2016.02); *F02M 35/10255* (2013.01); *F02B 29/0406* (2013.01); *F02B 33/00* (2013.01);
(Continued)

(58) Field of Classification Search
CPC ............... F02M 25/0704; F02M 25/0705; F02M 25/0706; F02M 25/071; F02M 25/0711; F02M 25/0712; F02M 25/072; F02M 25/0722; F02M 25/0724; F02M 25/0739; F02M 25/0744; F02M 25/0745; F02M 25/0748; F02M 25/0749; F02M 25/0751; F02M 26/02; F02M 26/03; F02M 26/04; F02M 26/05; F02M 26/06; F02M 26/07; F02M 26/08; F02M 26/09; F02M 26/10; F02M 26/19; F02M 26/21; F02M 26/34; F02M 26/38; F02M 26/39; F02M 26/42; F02M 26/43; F02M 26/44; F02B 33/00
USPC ....................................... 123/568.2; 60/605.2
See application file for complete search history.

(56) References Cited

U.S. PATENT DOCUMENTS 6,973,786 B1 * 12/2005 Liu .................... F02M 25/0709
                                                    123/559.2
7,165,403 B2 * 1/2007 Sun ....................... F02B 37/013
                                                     60/605.2
(Continued)

FOREIGN PATENT DOCUMENTS

CN         101970845 A        2/2011
CN         102678392 A        9/2012
CN         102834601 A       12/2012

OTHER PUBLICATIONS

Office Action issued on Mar. 4, 2016 in corresponding CN Application No. 201410324328.9.

*Primary Examiner* — Stephen K Cronin
*Assistant Examiner* — Kevin R Steckbauer
(74) *Attorney, Agent, or Firm* — Cantor Colburn LLP

(57) ABSTRACT

An internal combustion engine comprises a first engine bank and a second engine bank. A first intake valve is disposed in an intake port of a cylinder of the first engine bank, and is configured for metering the first flow of combustion air by periodically opening and closing according to a first intake valve lift and duration characteristic. A variable valve train control mechanism is configured for affecting the first intake valve lift and duration characteristic. Either a lift or duration of the first intake valve is modulated so as to satisfy an EGR control criterion.

6 Claims, 1 Drawing Sheet

(51) Int. Cl.
*F02B 27/02* (2006.01)
*F02B 29/04* (2006.01)
*F02B 33/00* (2006.01)

(52) U.S. Cl.
CPC .............. *F02M 26/03* (2016.02); *F02M 26/38* (2016.02); *F02M 26/39* (2016.02); *F02M 35/10045* (2013.01); *Y02T 10/121* (2013.01); *Y02T 10/146* (2013.01)

(56) References Cited

U.S. PATENT DOCUMENTS

| | | | | |
|---|---|---|---|---|
| 8,069,663 B2* | 12/2011 | Ulrey | ................... | F02D 13/0249 123/568.12 |
| 8,561,599 B2* | 10/2013 | Gingrich | ........... | F02M 25/0707 123/568.17 |
| 8,607,544 B2* | 12/2013 | Uhrich | ................... | F01N 3/0842 123/198 F |
| 8,616,186 B2* | 12/2013 | Surnilla | ............. | F02M 25/0707 123/568.11 |
| 8,631,646 B2* | 1/2014 | Smith | ................... | F01N 3/0842 123/198 F |
| 8,881,713 B2* | 11/2014 | Surnilla | ............. | F02D 41/0245 123/568.22 |
| 8,904,787 B2* | 12/2014 | Styles | ...................... | F02D 9/02 60/605.2 |
| 8,914,221 B2* | 12/2014 | Peters | ................. | F02D 41/0065 123/568.21 |
| 8,919,097 B2* | 12/2014 | Kerns | ................. | F02D 41/0087 123/198 F |
| 8,944,034 B2* | 2/2015 | Gingrich | ............. | F02B 27/0215 123/315 |
| 9,032,940 B2* | 5/2015 | Dane | ................... | F02D 41/0065 123/568.11 |
| 9,038,611 B2* | 5/2015 | Lyon | ................... | F02M 25/0707 123/568.11 |
| 9,080,536 B2* | 7/2015 | Flynn | ................. | F02M 25/0722 |
| 9,157,363 B2* | 10/2015 | Wade | ...................... | F02B 37/04 |
| 2005/0241299 A1 | 11/2005 | Brown | | |
| 2005/0268880 A1 | 12/2005 | Bidner et al. | | |
| 2011/0265771 A1* | 11/2011 | Banker | ................. | F01N 3/0814 123/564 |
| 2011/0307127 A1* | 12/2011 | Swenson | ................. | F02B 37/16 701/21 |
| 2012/0285161 A1 | 11/2012 | Kerns et al. | | |
| 2014/0014075 A1* | 1/2014 | Yager | ................. | F02D 41/0047 123/568.11 |
| 2014/0261333 A1* | 9/2014 | Foege | ................. | F02D 41/0082 123/472 |
| 2014/0305416 A1* | 10/2014 | Gukelberger | ...... | F02M 25/0707 123/568.21 |
| 2015/0128917 A1* | 5/2015 | Surnilla | ............. | F02D 41/0087 123/568.16 |
| 2015/0136076 A1* | 5/2015 | Styles | .................... | F02D 17/04 123/325 |
| 2015/0152815 A1* | 6/2015 | Hardman | ........... | F02M 25/0749 123/58.8 |

* cited by examiner

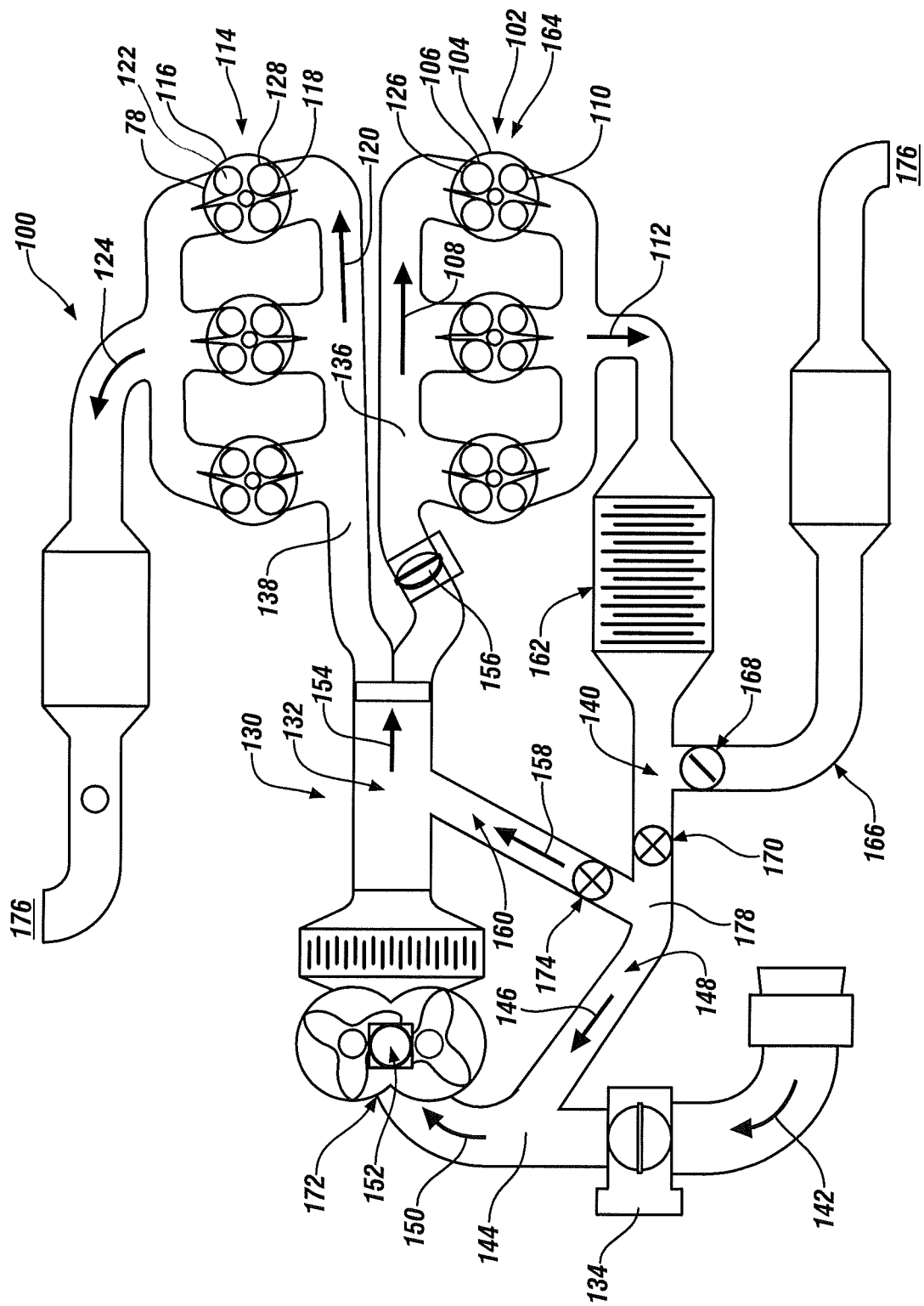

DEDICATED EGR ENGINE WITH DYNAMIC LOAD CONTROL

FEDERAL RESEARCH STATEMENT

This invention was made with U.S Government support under Agreement No. DE-EE0005654, awarded by the Department of Energy. The U.S. Government may have certain rights in this invention.

FIELD OF THE INVENTION

The subject invention relates to internal combustion engines with exhaust gas recirculation, and more particularly to an internal combustion engine that may be operated in various EGR modes with widely varying ranges of EGR.

BACKGROUND

In today's world, it is desirable to have internal combustion engines with improved fuel economy and reduced emissions while producing acceptable levels of power. A means for simultaneously achieving these objectives is to use exhaust gas recirculation (EGR). Unfortunately, conventional engines are typically unable to operate in a wide range of displacements while allowing for the relatively high levels of EGR that may be necessary in some operating modes to mitigate spark knock and to also improve fuel economy. In addition, it has thus far not been practical to provide for symmetric, or near symmetric, delivery of hydrogen rich EGR to all cylinders of an engine with the ability to reduce throttling losses at light loads so as to provide for a reduction in fuel consumption.

Accordingly, it is desirable to provide an invention that addresses these and other deficiencies in the prior art.

SUMMARY OF THE INVENTION

In one exemplary embodiment of the invention an internal combustion engine comprises a first engine bank defining a first combustion chamber with a first intake port for providing a first flow of combustion air to the first combustion chamber and with a first exhaust port for providing a first flow of combustion products from the first combustion chamber. A second engine bank defines a second combustion chamber with a second intake port for providing a second flow of combustion air to the second combustion chamber and with a second exhaust port for providing a second flow of combustion products from the second combustion chamber. A first intake valve is disposed in the first intake port, and the first intake valve is configured for metering the first flow of combustion air by periodically opening and closing according to a first intake valve lift and duration characteristic.

A second intake valve is disposed in the second intake port, and the second intake valve is configured for metering the second flow of combustion air by periodically opening and closing according to a second intake valve lift and duration characteristic. An intake manifold defines an intake plenum, and the intake manifold also defines an air inlet, a first intake runner, a second intake runner, and an EGR duct, each being in fluid communication with the intake plenum. The air inlet is in fluid communication with a supply of ambient air and configured for carrying the supply of ambient air for delivery to the intake plenum. The first intake runner is in fluid communication with the first intake port and configured for carrying the first flow of combustion air from the intake plenum to the first intake port. The second intake runner is in fluid communication with the second intake port and configured for carrying the second flow of combustion air from the intake plenum to the second intake port. The EGR duct is in fluid communication with the first exhaust port and configured for carrying the first flow of combustion products from the first exhaust port to the intake plenum.

In another exemplary embodiment of the invention a variable valve train control mechanism is provided that is configured for affecting the first intake valve lift and duration characteristic. Either a lift or duration of the first intake valve is modulated so as to satisfy an EGR control criterion.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawing, which is a schematic drawing showing an internal combustion engine in accordance with an exemplary embodiment of the invention.

DETAILED DESCRIPTION OF THE DRAWINGS

The following description is merely exemplary in nature and is not intended to limit the present disclosure, its application or uses. In accordance with an exemplary embodiment of the invention, an internal combustion engine 100 comprises a first engine bank 102 defining a first combustion chamber 104 with a first intake port 106 for providing a first flow of combustion air 108 to the first combustion chamber 104. The first engine bank 102 also defines a first exhaust port 110 for providing a first flow of combustion products 112 from the first combustion chamber 104. A second engine bank 114 defines a second combustion chamber 116 with a second intake port 118 for providing a second flow of combustion air 120 to the second combustion chamber 116. The second engine bank 114 also defines a second exhaust port 122 for providing a second flow of combustion products 124 from the second combustion chamber 116.

A first intake valve 126 is disposed in the first intake port 106 and is configured for metering the first flow of combustion air 108 by periodically opening and closing according to a first intake valve lift and duration characteristic. It should be appreciated that the first intake valve 126 may comprise a single poppet valve, a plurality of poppet valves, or any apparatus suitable for performing the function of metering the first flow of combustion air 108 according to a desired characteristic. A second intake valve 128 is similarly disposed in the second intake port 118. The second intake valve 128 is configured for metering the second flow of combustion air 120 by periodically opening and closing according to a second intake valve lift and duration characteristic. It should be appreciated that the second intake valve 128 may comprise a single poppet valve, a plurality of poppet valves, or any apparatus suitable for performing the function of metering the second flow of combustion air 120 according to a desired characteristic.

The engine also includes an intake manifold 130, which defines an intake plenum 132. In addition, the intake manifold 130 defines an air inlet 134, a first intake runner 136, a second intake runner 138, and an EGR duct 140. Each of the air inlet 134, the first intake runner 136, the second intake runner 138, and the EGR duct 140 is in fluid communication with the intake plenum 132. The air inlet 134 is in fluid communication with a supply of ambient air 142 and is configured for carrying the supply of ambient air 142 for delivery to an inlet mixer 144, where the supply of ambient air 142 is combined with a pre-boost EGR stream 146 carried by the boost leg 148 to create boost-inlet stream 150, which is delivered to a supercharger 172 and subsequently to the intake plenum 132. The intake plenum 132 provides a common supply of combustion air 154, which is split to create the first flow of combustion air 108 in the first intake runner 136 and the second flow of combustion air 120 in the second intake runner 138. A throttle valve 156 may be disposed in the first intake runner 136 for controlling the relationship between first flow of combustion air 108 and second flow of combustion air 120, which are each extracted from the common supply of combustion air 154 traveling through the intake plenum 132. The first intake runner 136 is in fluid communication with the first intake port 106 and is configured for carrying the first flow of combustion air 108 from the intake plenum 132 to the first intake port 106.

The second intake runner 138 is in fluid communication with the second intake port 118 and is configured for carrying the second flow of combustion air 120 from the intake plenum 132 to the second intake port 118. The EGR duct 140 is in fluid communication with the first exhaust port 110 and is configured for carrying the first flow of combustion products 112 from the first exhaust port 110 to an EGR splitter 178, where the combustion products 112 are divided between a post-boost EGR stream 158 and the pre-boost EGR stream 146. The post-boost EGR stream 158 is directed through a direct return leg 160 to the intake plenum 132. The pre-boost EGR stream 146 is directed through boost leg 148 and is combined with the ambient air 142 at an inlet mixer 144 to form the boost-inlet stream 150. A recuperator 162 may be disposed (e.g., upstream from the EGR splitter 178) for extracting heat from the combustion products 112 prior to their reintroduction to the intake plenum 132.

In an exemplary embodiment, the internal combustion engine 100 comprises a variable valve train control mechanism 164 that is configured for affecting the first intake valve 126 lift and duration characteristic by modulating a lift of the first intake valve 126, by modulating a duration of the first intake valve 126, or by modulating a lift and a duration of the first intake valve 126.

In an exemplary embodiment, the internal combustion engine 100 comprises an EGR vent 166 that is in fluid communication with the EGR duct 140 and that is configured for carrying at least a portion of the first flow of combustion products 112 from the EGR duct 140 to be discharged to atmosphere 176. An EGR vent flow control valve 168 may be disposed in the EGR vent 166, and the EGR vent flow control valve 168 may be configured for allowing at least a portion of the first flow of combustion products 112 to be vented to the atmosphere 176 when the EGR vent flow control valve 168 is in an open mode and to prevent release of the first flow of combustion products 112 to the atmosphere 176 when the EGR vent flow control valve 168 is in a closed mode.

In an exemplary embodiment, the internal combustion engine 100 comprises an EGR return flow control valve 170 disposed in the EGR duct 140. In accordance with this embodiment, the EGR return flow control valve 170 is configured for allowing at least a portion of the first flow of combustion products 112 to be delivered directly to the intake plenum 132 when the EGR return flow control valve 170 is in an open mode and to prevent flow of the first flow of combustion products 112 directly to the intake plenum 132 when the EGR return flow control valve 170 is in a closed mode.

In an exemplary embodiment, the EGR duct 140 has a boost leg 148 and a direct return leg 160, the direct return leg 160 being in fluid communication with the intake plenum 132. The boost leg 148 is in fluid communication with an inlet 152 of a supercharger 172, and is configured for carrying the first flow of combustion products 112 to be mixed with the supply of ambient air 142, to create a boost-inlet stream 150 and to deliver the boost-inlet stream 150 to the inlet 152 of the supercharger 172. The supercharger 172 is in fluid communication with the inlet 152 of the supercharger 172 and with the intake plenum 132. The supercharger 172 is configured for compressing the combined flow of combustion air 150 and delivering the combined flow of combustion air 150 to the intake plenum 132.

In an exemplary embodiment, an EGR boost flow control valve 174 is disposed in the direct return leg 160. The EGR boost flow control valve 174 is configured and arranged for allowing at least a portion of the first flow of combustion products 112 to be delivered through the direct return leg 160 to the intake plenum 132 when the EGR boost flow control valve 174 is in an open mode and to prevent flow through the direct return leg 160 to or from the intake plenum 132 when the EGR boost flow control valve 174 is in a closed mode.

In one embodiment, the internal combustion engine 100 comprises an EGR vent 166 that is in fluid communication with the EGR duct 140 and that is configured for carrying at least a portion of the first flow of combustion products 112 from the EGR duct 140 to be discharged to atmosphere 176. In addition, the internal combustion engine 100 comprises an EGR vent flow control valve 168 disposed in the EGR vent 166. The EGR vent flow control valve 168 is configured for allowing at least a portion of the first flow of combustion products 112 to be vented to the atmosphere 176 when the EGR vent flow control valve 168 is in an open mode and to prevent release of the first flow of combustion products 112 to the atmosphere 176 when the EGR vent flow control valve 168 is in a closed mode. In addition, in accordance with this embodiment, an EGR return flow control valve 170 is disposed in the EGR duct 140, and the EGR vent flow control valve 168 is configured for allowing at least a portion of the first flow of combustion products 112 to be delivered directly to the intake plenum 132 when the EGR return flow control valve 170 is in an open mode and to prevent flow of the first flow of combustion products 112 directly to the intake plenum 132 when the EGR return flow control valve 170 is in a closed mode.

In yet another exemplary embodiment, an internal combustion engine 100 includes an EGR vent 166 that is in fluid communication with the EGR duct 140 and that is configured for carrying at least a portion of the first flow of combustion products 112 from the EGR duct 140 to be discharged to atmosphere 176. An EGR vent flow control valve 168 is disposed in the EGR vent 166, and the EGR vent flow control valve 168 is configured for allowing at least a portion of the first flow of combustion products 112 to be vented to the atmosphere 176 when the EGR vent flow control valve 168 is in an open mode and to prevent release of the first flow of combustion products 112 to the atmosphere 176 when the EGR vent flow control valve 168 is in a closed mode. In addition, the EGR duct 140 has a boost leg 148 and a direct return leg 160, the direct return leg 160 being in fluid communication with the intake plenum 132. The boost leg 148 is in fluid communication with an inlet 152 of a supercharger 172 and is configured for carrying the first flow of combustion products 112 to be mixed with the supply of ambient air 142, to create a combined flow of combustion air 150, and to deliver the combined flow of combustion air 150 to the inlet 152 of the supercharger 172. The supercharger 172 is in fluid communication with the inlet 152 of the supercharger 172 and with the intake plenum 132 and is configured for compressing the combined flow of combustion air 150 and delivering the combined flow of combustion air 150 to the intake plenum 132. Still further, an EGR boost flow control valve 174 is disposed in the direct return leg 160, and the EGR boost flow control valve 174 is configured for allowing at least a portion of the first flow of combustion products 112 to be delivered through the direct return leg 160 to the intake plenum 132 when the EGR boost flow control valve 174 is in an open mode and to prevent flow through the direct return leg 160 to or from the intake plenum 132 when the EGR boost flow control valve 174 is in a closed mode.

In yet another exemplary embodiment, an internal combustion engine 100 includes an EGR return flow control valve 170 disposed in the EGR duct 140, and the EGR return flow control valve 170 is configured for allowing at least a portion of the first flow of combustion products 112 to be delivered directly to the intake plenum 132 when the EGR return flow control valve 170 is in an open mode and to prevent flow of the first flow of combustion products 112 directly to the intake plenum 132 when the EGR return flow control valve 170 is in a closed mode. In addition, the EGR duct 140 has a boost leg 148 and a direct return leg 160, with the direct return leg 160 being in fluid communication with the intake plenum 132. The boost leg 148 is in fluid communication with an inlet 152 of a supercharger 172 and is configured for carrying the first flow of combustion products 112 to be mixed with the supply of ambient air 142, to create a combined flow of combustion air 150, and to deliver the combined flow of combustion air 150 to the inlet 152 of the supercharger 172. The supercharger 172 is in fluid communication with the inlet 152 of the supercharger 172 and with the intake plenum 132 and is configured for compressing the combined flow of combustion air 150 and delivering the combined flow of combustion air 150 to the intake plenum 132. An EGR boost flow control valve 174 is disposed in the direct return leg 160, and is configured for allowing at least a portion of the first flow of combustion products 112 to be delivered through the direct return leg 160 to the intake plenum 132 when the EGR boost flow control valve 174 is in an open mode and to prevent flow through the direct return leg 160 to or from the intake plenum 132 when the EGR boost flow control valve 174 is in a closed mode.

In yet another exemplary embodiment, an internal combustion engine 100 includes an EGR vent 166 in fluid communication with the EGR duct 140 and configured for carrying at least a portion of the first flow of combustion products 112 from the EGR duct 140 to be discharged to atmosphere 176. An EGR vent flow control valve 168 is disposed in the EGR vent 166, and the EGR vent flow control valve 168 is configured for allowing at least a portion of the first flow of combustion products 112 to be vented to the atmosphere 176 when the EGR vent flow control valve 168 is in an open mode and to prevent release of the first flow of combustion products 112 to the atmosphere 176 when the EGR vent flow control valve 168 is in a closed mode. An EGR return flow control valve 170 is disposed in the EGR duct 140 and is configured for allowing at least a portion of the first flow of combustion products 112 to be delivered directly to the intake plenum 132 when the EGR return flow control valve 170 is in an open mode and to prevent flow of the first flow of combustion products 112 directly to the intake plenum 132 when the EGR return flow control valve 170 is in a closed mode.

The EGR duct 140 has a boost leg 148 and a direct return leg 160, and the direct return leg 160 is in fluid communication with the intake plenum 132. The boost leg 148 is in fluid communication with an inlet 152 of a supercharger 172 and is configured for carrying the first flow of combustion products 112 to be mixed with the supply of ambient air 142, to create a combined flow of combustion air 150, and to deliver the combined flow of combustion air 150 to the inlet 152 of the supercharger 172. The supercharger 172 is in fluid communication with the inlet 152 of the supercharger 172 and with the intake plenum 132 and is configured for compressing the combined flow of combustion air 150 and delivering the combined flow of combustion air 150 to the intake plenum 132. An EGR boost flow control valve 174 is disposed in the direct return leg 160. The EGR boost flow control valve 174 is configured for allowing at least a portion of the first flow of combustion products 112 to be delivered through the direct return leg 160 to the intake plenum 132 when the EGR boost flow control valve 174 is in an open mode and to prevent flow through the direct return leg 160 to or from the intake plenum 132 when the EGR boost flow control valve 174 is in a closed mode.

A method for controlling an internal combustion engine 100 comprises providing a first engine bank 102 defining a first combustion chamber 104 with a first intake port 106 for providing a first flow of combustion air 108 to the first combustion chamber 104 and with a first exhaust port 110 for providing a first flow of combustion products 112 from the first combustion chamber 104. A second engine bank 114 is also provided, defining a second combustion chamber 116 with a second intake port 118 for providing a second flow of combustion air 120 to the second combustion chamber 116 and with a second exhaust port 122 for providing a second flow of combustion products 112 from the second combustion chamber 116. A first intake valve 126 is disposed in the first intake port 106, and the first intake valve 126 is configured for metering the first flow of combustion air 108 by periodically opening and closing according to a first intake valve 126 lift and duration characteristic.

A second intake valve 128 is disposed in the second intake port 118, and the second intake valve 128 is configured for metering the second flow of combustion air 120 by periodically opening and closing according to a second intake valve lift and duration characteristic. An intake manifold 130 is provided defining an intake plenum 132. The intake manifold 130 also defines an air inlet 134, a first intake runner 136, a second intake runner 138, and an EGR duct 140, each being in fluid communication with the intake plenum 132. The air inlet 134 is in fluid communication with a supply of ambient air 142 and configured for carrying the supply of ambient air 142 for delivery to the intake plenum 132, and the first intake runner 136 is in fluid communication with the first intake port 106 and configured for carrying the first flow of combustion air 108 from the intake plenum 132 to the first intake port 106. The second intake runner 138 is in fluid communication with the second intake port 118 and is configured for carrying the second flow of combustion air 120 from the intake plenum 132 to the second intake port 118. The EGR duct 140 is in fluid communication with the first exhaust port 110 and is configured for carrying the first flow of combustion products 112 from the first exhaust port 110 to the intake plenum 132.

In accordance with this exemplary method, a variable valve train control mechanism 164 is provided, the mechanism being configured for affecting the first intake valve 126 lift and duration characteristic. Finally, either a lift or a duration of the first intake valve 126 is modulated so as to satisfy an EGR control criterion. It should be appreciated that a duration of the first intake valve 126 may be modulated or a lift of the first intake valve 126 may be modulated or both a lift and a duration of the first intake valve 126 may be modulated.

In an exemplary embodiment, an EGR vent 166 may be provided so as to be in fluid communication with the EGR duct 140. The EGR vent 166 is configured for carrying at least a portion of the first flow of combustion products 112 from the EGR duct 140 to be discharged to atmosphere 176. An EGR vent flow control valve 168 may also be disposed in the EGR vent 166 such that the EGR vent flow control valve 168 is configured for allowing at least a portion of the first flow of combustion products 112 to be vented to the atmosphere 176 when the EGR vent flow control valve 168 is in an open mode and to prevent release of the first flow of combustion products 112 to the atmosphere 176 when the EGR vent flow control valve 168 is in a closed mode. An EGR return flow control valve 170 may also be disposed in the EGR duct 140 such that the EGR vent flow control valve 168 is configured for allowing at least a portion of the first flow of combustion products 112 to be delivered directly to the intake plenum 132 when the EGR return flow control valve 170 is in an open mode and to prevent flow of the first flow of combustion products 112 directly to the intake plenum 132 when the EGR return flow control valve 170 is in a closed mode. In an exemplary embodiment, the EGR duct 140 is provided with a boost leg 148 and a direct return leg 160, the direct return leg 160 being in fluid communication with the intake plenum 132 such that the boost leg 148 is in fluid communication with an inlet 152 of a supercharger 172. The boost leg 148 is configured for carrying the first flow of combustion products 112 to be mixed with the supply of ambient air 142, to create a combined flow of combustion air 150, and to deliver the combined flow of combustion air 150 to the inlet 152 of the supercharger 172. The supercharger 172 is provided so as to be in fluid communication with the inlet 152 of the supercharger 172 and with the intake plenum 132 and to be configured for compressing the combined flow of combustion air 150 and delivering the combined flow of combustion air 150 to the intake plenum 132.

In accordance with this exemplary method, an EGR boost flow control valve 174 is provided so as to be disposed in the direct return leg 160. The EGR boost flow control valve 174 is configured for allowing at least a portion of the first flow of combustion products 112 to be delivered through the direct return leg 160 to the intake plenum 132 when the EGR boost flow control valve 174 is in an open mode and to prevent flow through the direct return leg 160 to or from the intake plenum 132 when the EGR boost flow control valve 174 is in a closed mode. To facilitate operating the internal combustion engine 100 in a normally aspirated mode, producing power in both the first engine bank 102 and the second engine bank 114, the method includes closing the EGR return flow control valve 170. In a further embodiment, the EGR vent flow control valve 168 may be closed so as to operate the internal combustion engine 100 with the first engine bank 102 deactivated. Further still, the EGR boost flow control valve 174 may be closed so as to operate the internal combustion engine 100 in a boosted mode while the first engine bank 102 is operated at a relatively light load in accordance with the first intake valve 126 lift and duration characteristic while the second engine bank 114 is operated at a relatively heavy load.

In an exemplary embodiment, an internal combustion engine 100 may be provided with an EGR vent 166 in fluid communication with the EGR duct 140 and configured for carrying at least a portion of the first flow of combustion products 112 from the EGR duct 140 to be discharged to atmosphere 176. An EGR vent flow control valve 168, may then be disposed in the EGR vent 166 such that the EGR vent flow control valve 168 is configured for allowing at least a portion of the first flow of combustion products 112 to be vented to the atmosphere 176 when the EGR vent flow control valve 168 is in an open mode and to prevent release of the first flow of combustion products 112 to the atmosphere 176 when the EGR vent flow control valve 168 is in a closed mode. An EGR return flow control valve 170 may be disposed in the EGR duct 140 such that the EGR vent flow control valve 168 is configured for allowing at least a portion of the first flow of combustion products 112 to be delivered directly to the intake plenum 132 when the EGR return flow control valve 170 is in an open mode and to prevent flow of the first flow of combustion products 112 directly to the intake plenum 132 when the EGR return flow control valve 170 is in a closed mode.

In further accordance with this method, the EGR duct 140 is provided with a boost leg 148 and a direct return leg 160, the direct return leg 160 being in fluid communication with the intake plenum 132, and the boost leg 148 being in fluid communication with an inlet 152 of a supercharger 172 such that the boost leg 148 is configured for carrying the first flow of combustion products 112 to be mixed with the supply of ambient air 142, to create a combined flow of combustion air 150, and to deliver the combined flow of combustion air 150 to the inlet 152 of the supercharger 172. The supercharger 172 is provided to be in fluid communication with the inlet 152 of the supercharger 172 and with the intake plenum 132 and is configured for compressing the combined flow of combustion air 150 and delivering the combined flow of combustion air 150 to the intake plenum 132. An EGR boost flow control valve 174 is disposed in the direct return leg 160 and configured for allowing at least a portion of the first flow of combustion products 112 to be delivered through the direct return leg 160 to the intake plenum 132 when the EGR boost flow control valve 174 is in an open mode and to prevent flow through the direct return leg 160 to or from the intake plenum 132 when the EGR boost flow control valve 174 is in a closed mode.

In accordance with this exemplary method, the EGR vent flow control valve 168 is closed so as to operate the internal combustion engine 100 in a normally aspirated dedicated EGR mode. In a further exemplary embodiment, the EGR boost flow control valve 174 is closed so as to operate the internal combustion engine 100 in a boosted mode while the first engine bank 102 is operated at a relatively light load in accordance with the first intake valve 126 lift and duration characteristic, producing a dedicated supply of EGR, while the second engine bank 114 is operated at a relatively heavy load.

Accordingly, the engine may be operated in a number of modes such as: (a) a dual bank operating mode in which the EGR boost flow control valve 174 and the EGR vent flow control valve 168 are open and the EGR return flow control valve 170 is closed. In this mode, the engine operates as a normally aspirated dual bank engine such as a V6 engine having three operating cylinders in each bank; (b) a single bank mode in which the EGR boost flow control valve 174 is open and both the EGR return flow control valve 170 and the EGR vent flow control valve 168 are closed. In this mode, the engine operates with one bank of the engine deactivated such as wherein a V6 engine is operated on only three cylinders; (c) a CVVL mode with natural aspiration and without a dedicated supply of EGR in which the EGR return flow control valve 170 is closed and both the EGR boost flow control valve 174 and the EGR vent flow control valve 168 are closed. In this mode, the engine may be operated with one bank of cylinders at a heavy load and with the CVVL modulated cylinders operated at a light load; (d) a CVVL mode with natural aspiration and with a dedicated supply of EGR in which the EGR vent flow control valve 168 is closed and both the EGR boost flow control valve 174 and the EGR return flow control valve 170 are open. In this mode, the engine operates with one bank at a heavy load and with the CVVL bank at a lighter load providing EGR to the intake manifold 130 as a dedicated supply of EGR; (e) a CVVL boosted mode with a non-dedicated supply of EGR in which the EGR boost flow control valve 174, the EGR return flow control valve 170, and the EGR vent flow control valve 168 are all closed. In this mode, the engine operates in a boosted mode with one bank of cylinders at a heavier load and the other bank of cylinders at a lighter load controlled by the CVVL mechanism; and (f) a CVVL boosted mode with a dedicated supply of EGR in which the EGR boost flow control valve 174 is closed and both the EGR return flow control valve 170 and the EGR vent flow control valve 168 are open. In this mode, the engine operates in boosted mode with one bank of cylinders at a heavy load and with the other cylinders at a lighter load controlled by the CVVL mechanism and providing EGR to the intake manifold 130 in a dedicated EGR mode.

As a result, an engine is provided wherein one bank of cylinders may be operated at high loads while the other bank is operated as a supply of dedicated EGR to all of the cylinders. The cylinders providing dedicated EGR may be operated with full CVVL capability (lift and duration) to control the amount of effective displacement and EGR as called for depending on the load (i.e., power output) sought by the operator. The invention provides a simplified engine wherein a plurality of cylinders, half (or potentially less than half), have their valve train controlled by a continuously variable valve train control mechanism 164 to allow for variation in valve lift and valve event duration. Cylinders equipped with the CVVL capability are utilized to supply EGR via a path from the exhaust port of the CVVL equipped cylinders to the intake manifold 130 of the engine.

As a further result, the invention provides for: symmetric torque delivery at the flywheel for improved performance (unlike trying to run a V6 in 4 cylinder mode for example); cost reduction by requiring CVVL on only one cylinder bank as opposed to CVVL on both cylinder banks; and the ability to run a single bank of cylinders at optimal combustion efficiency throughout a broad range of operating conditions. The invention enables a dual-bank engine to operate with only a single bank, producing a wide range of available displacements for significant reductions in fuel consumption.

Continuous Variable Valve Lift (CVVL) systems employ mechanisms such as switching between slow and fast cams to achieve speed-dependent variations in valve lift. An ideal variable valve lift system may be capable of varying valve lift continuously such that at higher rpm, higher lift is provided by supplying the engine more air to breathe. At low rpm, lift may be reduced to increase air flow velocities, thereby improving air/fuel mixing to provide improved fuel economy and emissions. CVVL may be used to regulate engine output, reducing dependence on throttle butterfly and reducing attendant pressure losses.

The invention provides for a symmetric or near symmetric delivery of hydrogen rich EGR to all cylinders of the engine with the ability to reduce throttling losses at light loads for a reduction in fuel consumption.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling an internal combustion engine comprising:
   providing a first engine bank defining a first combustion chamber with a first intake port for providing a first flow of combustion air to the first combustion chamber and with a first exhaust port for providing a first flow of combustion products from the first combustion chamber;
   providing a second engine bank defining a second combustion chamber with a second intake port for providing a second flow of combustion air to the second combustion chamber and with a second exhaust port for providing a second flow of combustion products from the second combustion chamber;
   providing a first intake valve disposed in the first intake port, the first intake valve being configured for metering the first flow of combustion air by periodically opening and closing according to a first intake valve lift and duration characteristic;
   providing a second intake valve disposed in the second intake port, the second intake valve being configured for metering the second flow of combustion air by periodically opening and closing according to a second intake valve lift and duration characteristic; and
   providing an intake manifold defining an intake plenum, the intake manifold also defining an air inlet, a first intake runner, a second intake runner, and an EGR duct, each being in fluid communication with the intake plenum, wherein the EGR duct includes an EGR splitter forming a boost leg and a direct return leg, the boost leg being fluidically connected to an inlet of a supercharger and the direct return leg being in fluid communication with the intake plenum;
   providing an EGR return flow control valve disposed in the EGR duct, the EGR vent flow control valve being configured for allowing at least a portion of the first flow of combustion products to be delivered directly to the intake plenum when the EGR return flow control valve is in an open mode and to prevent flow of the first flow of combustion products directly to the intake plenum when the EGR return flow control valve is in a closed mode;
   wherein the air inlet is in fluid communication with a supply of ambient air and configured for carrying the supply of ambient air for delivery to the intake plenum;

wherein the first intake runner is in fluid communication with the first intake port and configured for carrying the first flow of combustion air from the intake plenum to the first intake port;

wherein the second intake runner is in fluid communication with the second intake port and configured for carrying the second flow of combustion air from the intake plenum to the second intake port; and wherein the EGR duct is in fluid communication with the first exhaust port and configured for carrying the first flow of combustion products from the first exhaust port to the intake plenum;

further comprising providing a variable valve train control mechanism configured for affecting the first intake valve lift and duration characteristic;

modulating either a lift or duration of the first intake valve so as to satisfy an EGR control criterion;

providing an EGR vent in fluid communication with the EGR duct and configured for carrying at least a portion of the first flow of combustion products from the EGR duct to be discharged to atmosphere;

providing an EGR vent flow control valve disposed in the EGR vent, the EGR vent flow control valve configured for allowing at least a portion of the first flow of combustion products to be vented to the atmosphere when the EGR vent flow control valve is in an open mode and to prevent release of the first flow of combustion products to the atmosphere when the EGR vent flow control valve is in a closed mode;

wherein the boost leg is in fluid communication with an inlet of a supercharger, the boost leg is configured for carrying the first flow of combustion products to be mixed with the supply of ambient air, to create a combined flow of combustion air, and to deliver the combined flow of combustion air to the inlet of the supercharger;

wherein the supercharger is in fluid communication with the inlet of the supercharger and with the intake plenum;

wherein the supercharger is configured for compressing the combined flow of combustion air and delivering the combined flow of combustion air to the intake plenum;

further comprising providing an EGR boost flow control valve disposed in the direct return leg, the EGR boost flow control valve configured for allowing at least a portion of the first flow of combustion products to be delivered through the direct return leg to the intake plenum when the EGR boost flow control valve is in an open mode and to prevent flow through the direct return leg to or from the intake plenum when the EGR boost flow control valve is in a closed mode; and further comprising closing the EGR return flow control valve so as to operate the internal combustion engine in a normally aspirated mode, producing power in both the first engine bank and the second engine bank.

2. The method of claim 1, comprising modulating duration of the first intake valve.

3. The method of claim 1, comprising modulating a lift of the first intake valve.

4. The method of claim 1, comprising modulating a lift and duration of the first intake valve.

5. The method of claim 1, further comprising closing the EGR vent flow control valve so as to operate the internal combustion engine with the first engine bank deactivated.

6. The method of claim 1, further comprising closing the EGR boost flow control valve so as to operate the internal combustion engine in a boosted mode while the first engine bank is operated at a relatively light load in accordance with the first intake valve lift and duration characteristic while the second engine bank is operated at a relatively heavy load.

* * * * *